(12) United States Patent
Zhou et al.

(10) Patent No.: US 8,139,526 B2
(45) Date of Patent: Mar. 20, 2012

(54) WIRELESS COMMUNICATION SYSTEMS

(75) Inventors: Yuefeng Zhou, Haywards Heath (GB); Sunil Keshavji Vadgama, Ashford (GB); Michael John Beems Hart, London (GB)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 11/856,139

(22) Filed: Sep. 17, 2007

(65) Prior Publication Data

US 2008/0090585 A1 Apr. 17, 2008

(30) Foreign Application Priority Data

Oct. 13, 2006 (GB) ................................. 0620370.7

(51) Int. Cl.
H04W 4/00 (2009.01)
(52) U.S. Cl. .................... 370/329; 370/315; 370/348
(58) Field of Classification Search .................. 370/229, 370/235, 310, 315, 328, 329, 335, 345, 347, 370/348; 455/7, 11.1, 16, 24
See application file for complete search history.

(56) References Cited

U.S. PATENT DOCUMENTS

| | | | |
|---|---|---|---|
| 5,719,868 | A | 2/1998 | Young |
| 6,370,384 | B1 | 4/2002 | Komara |
| 6,701,129 | B1 | 3/2004 | Hashem et al. |
| 7,096,274 | B1 | 8/2006 | Ci et al. |
| 7,724,706 | B2 * | 5/2010 | Kang et al. .................... 370/331 |
| 2002/0080816 | A1 | 6/2002 | Spinar et al. |
| 2003/0054771 | A1 | 3/2003 | Chappaz |
| 2004/0005861 | A1 | 1/2004 | Tauchi |
| 2004/0100929 | A1 | 5/2004 | Garcia-Luna-Aceves |
| 2004/0109428 | A1 | 6/2004 | Krishnamurthy |
| 2005/0030887 | A1 | 2/2005 | Jacobsen et al. |

(Continued)

FOREIGN PATENT DOCUMENTS

EP 0 151 280 12/1984
(Continued)

OTHER PUBLICATIONS

Communication from the European Patent Office, European Search Report for Application No. EP 07 11 3538, Dec. 27, 2007, 7 pages.

(Continued)

Primary Examiner — Chi Pham
Assistant Examiner — Weibin Huang
(74) Attorney, Agent, or Firm — Baker Botts L.L.P.

(57) ABSTRACT

A wireless communication method in a wireless communication system is provided. In the wireless communication system, subscriber stations are each operable to communicate with a base station and the base station is capable of performing simultaneous communications with a number of subscriber stations by allocating an available capacity among the subscriber stations. The subscriber stations are required to issue capacity requests in order to obtain and/or maintain a connection with the base station, and communications between the subscriber stations and the base station are performed partly or wholly through at least one relay station. The provided wireless communication method includes, in the relay station, detecting capacity requests issued from a plurality of the subscriber stations, using the detected requests to form at least one combined capacity request, and transmitting the combined capacity request to the base station. Furthermore, the method includes, in the base station, responding to the combined capacity request by reserving capacity for said plurality of subscriber stations. In addition, the method includes, in the relay station or in the base station, allocating the reserved capacity among the plurality of subscriber stations.

40 Claims, 6 Drawing Sheets

Bandwidth Request ←

U.S. PATENT DOCUMENTS

| | | | |
|---|---|---|---|
| 2005/0048914 A1 | 3/2005 | Sartori et al. | |
| 2005/0058058 A1* | 3/2005 | Cho et al. | 370/208 |
| 2006/0023745 A1 | 2/2006 | Koo et al. | |
| 2006/0245352 A1* | 11/2006 | Kang et al. | 370/229 |
| 2006/0256741 A1 | 11/2006 | Nozaki | |
| 2006/0264172 A1 | 11/2006 | Izumikawa et al. | |
| 2007/0072604 A1* | 3/2007 | Wang | 455/428 |
| 2008/0002631 A1* | 1/2008 | Ramachandran | 370/338 |
| 2008/0043668 A1* | 2/2008 | Chen et al. | 370/329 |

FOREIGN PATENT DOCUMENTS

| | | |
|---|---|---|
| EP | 1 617 693 | 1/2006 |
| EP | 1 635 592 | 3/2006 |
| EP | 1 677 443 | 7/2006 |
| EP | 1 804 430 A1 | 7/2007 |
| WO | WO 99/44341 | 9/1999 |
| WO | WO 01/76289 | 10/2001 |
| WO | 02/082743 A2 | 10/2002 |
| WO | WO 03/058984 | 7/2003 |
| WO | WO 2004/056013 | 7/2004 |
| WO | WO 2004/107693 | 12/2004 |
| WO | WO 2005/067173 | 7/2005 |
| WO | WO 2006/012554 | 2/2006 |
| WO | WO 2006/065069 | 6/2006 |
| WO | WO 2006/098608 | 9/2006 |
| WO | WO 2006/120161 | 11/2006 |

OTHER PUBLICATIONS

Communication from the European Patent Office, European Search Report for Application No. EP 07113557.8-1525, Dec. 3, 2007, 7 pages.
The Patent Office, Search Report under Section 17, U.K. Application No. GB0616482, date of search Oct. 27, 2006, 1 page.
The Patent Office, Search Report under Section 17, U.K. Application No. GB0616471, date of search Oct. 27, 2006, 1 page.
The Patent Office, Search Report under Section 17, U.K. Application No. GB0616477, date of search Oct. 27, 2006, 1 page.
The Patent Office, Search Report under Section 17, U.K. Application No. GB0616472, date of search Nov. 3, 2006, 1 page.
The Patent Office, Search Report under Section 17, U.K. Application No. 0616479, date of search Oct. 27, 2006, 1 page.
The Patent Office, Search Report under Section 17, U.K. Application No. 0622124, date of search Dec. 7, 2006, 1 page.
The Patent Office, Search Report under Section 17, U.K. Application No. 0622122, date of search Nov. 28, 2006, 1 page.
IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.
Hart et al., "Relay Midamble," IEEE 802.16 Broadband Wireless Access Working Group <http://ieee802.org/16>, pp. 0-3, Nov. 6, 2006.
Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.
Hart et al., >, "TDD MR Frame Structure," IEEE 802.16 Broadband Wireless Access Working Group < http://ieee802.org/16>, pp. 1-10, Oct. 20, 2006.
Hart, "Dimensioning and System Level Analysis of an HSDPA Network with Relaying Nodes," 5 pages, 2005.
Chu, "Polyphase Codes with Good Periodic Correlation Properties," IEEE Transactions on Information Theory, Jul. 1972, pp. 531-532.
Frank et al., "Phase Shift Pulse Codes with Good Periodic Correlation Properties," IRE Transactions on Information Theory, pp. 381-382, Oct. 1962.
Milewski, "Periodic Sequences with Optimal Properties for Channel Estimation and Fast Start-Up Equalization," IBM Research and Development Journal, pp. 426-431, Sep. 1983.
Hart, "Optimal Transmit Power Balancing in Multi-Hop Networks," Fujitsu Laboratories of Europe, Ltd., 6 pages, 2005.
Golay, "Multi-Slit Spectrometry," Journal of the Optical Society of America, vol. 39, No. 6, pp. 437-444, Jun. 1949.
Golay, "Complementary Series," IRE Transactions on Information Theory, IT 7, pp. 82-87, Apr. 1961.
Zhou et al., "Communication Systems," Pending U.S. Appl. No. 11/840,492, filed Aug. 17, 2007.
Zhou et al., "Communication Systems," Pending U.S. Appl. No. 11/840,518, filed Aug. 17, 2007.
Hart et al., "Communication Systems," U.S. Appl. No. 11/840,546, filed Aug. 17, 2007.
Hart et al., "Communication Systems," U.S. Appl. No. 11/840,570, filed Aug. 17, 2007.
Zhou et al., "Communication Systems," U.S. Appl. No. 11/840,595, filed Aug. 17, 2007.
Hart et al., "Communication Systems," U.S. Appl. No. 11/840,621, filed Aug. 17, 2007.
Hart et al., "Communication Systems," U.S. Appl. No. 11/840,644, filed Aug. 17, 2007.
Hart et al., "Communication Systems," U.S. Appl. No. 11/840,669, filed Aug. 17, 2007.
Hart et al., "Communication Systems," U.S. Appl. No. 11/840,429, filed Sep. 7, 2007.
Hart et al., "Communication Systems," U.S. Appl. No. 11/840,430, filed Sep. 7, 2007.
Hart et al., "Wireless Communication Systems," U.S. Appl. No. 11/856,139, filed Sep. 17, 2007.
Hart et al., "Wireless Communication Systems," U.S. Appl. No. 11/856,145, filed Sep. 17, 2007.
Hart et al., "Communication Systems," U.S. Appl. No. 11/856,178, filed Sep. 17, 2007.
International Search Report, Application No. GB0620370.7, 1 page, Nov. 13, 2006.
Office Action, European Application No. 07113481.1, 4 pages, Jun. 17, 2009.
International Search Report, European Application No. 10152420.5, 5 pages, Mar. 29, 2010.
Communication from the European Patent Office, European Search Report for Application No. EP 08 15 8421, Oct. 21, 2008, 1 pages.
Communication from the European Patent Office, European Search Report for Application No. EP 07 11 3481, Oct. 19, 2007, 1 pages, Oct. 21, 2008.
Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.
Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.
Etri et al, Transmission of IP Packets over Ethernet over IEEE 802.16, draft-riegel-16ng-ip-over-eth-over-80216-01.txt, Oct. 1, 2006, pp. 1-16.
Kim et al., Fair and Efficient Multihop Scheduling Algorithm for IEEE 802.16 BWA Systems, pp. 895-901, Oct. 3-7, 2005.
European Patent Office, European Search Report for Application No. EP 08 15 5435, Aug. 1, 2008, 8 pages.
European Patent Office, European Search Report for Application No. EP 07 11 3483, Sep. 26, 2007, 6 pages.
IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.
Hart et al., "Factors That Affect Performance of a Mobile Multihop Relay System," IEEE 802.16 Presentation Submission Template (Rev.8.3), Sep. 13, 2005, 19 pages.
Relay Task Group of IEEE 802.16, "Part 16: Air Interface for Fixed and Mobile Broadband Wireless Access Systems," Multihop Relay Specification, p. 1-12 and 78-104, Jun. 6, 2007.

* cited by examiner

Bandwidth Request ←

Bandwidth Request ←
Combined Bandwidth Request by RS ←

| Head | Amount of the 1st IBR | Other information of the 1st IBR (Optional) | Connection ID of the 1st IBR | Amount of the 2nd IBR | Other information of the 2nd IBR (Optional) |
|---|---|---|---|---|---|
| Connection ID of the 2nd IBR | ••• | Amount of the $N^{th}$ IBR | Other information of the $N^{th}$ IBR (Optional) | Connection ID of the $N^{th}$ IBR | Check sequence |

*Fig.9*

| Head | The aggregation of all IBR | Other information (Optional) | An existing connection ID in RS associated with all CIDs used by the radio devices connected to itself | Check sequence |
|---|---|---|---|---|

*Fig.10*

WIRELESS COMMUNICATION SYSTEMS

RELATED APPLICATION

This application claims foreign priority benefits under 35 U.S.C. §119 of United Kingdom Application No. GB 0620370.7, filed on Oct. 13, 2006, entitled "Wireless Communication Systems".

TECHNICAL FIELD

This invention relates in general to wireless communication systems, and more particularly to processing bandwidth requests in a wireless communication system.

Overview

Recently, various standards have been developed for data communication over broadband wireless links. One such standard is set out in the IEEE 802.16 specifications and is commonly known as WiMAX. The specifications include IEEE 802.16-2004, primarily intended for systems having fixed subscriber stations, and an enhanced specification IEEE 802.16e-2005 which among other things provides for mobile subscriber stations. In the following description, the term subscriber station (SS) applies to both fixed and mobile stations (SS/MS).

The entire content of IEEE Std 802.16-2004 "Air Interface for Fixed Broadband Wireless Access Systems" is hereby incorporated by reference. IEEE 802.16 envisages single-hop systems in which the subscriber station communicate directly with a base station within range, the range of a base station defining a "cell". By deploying multiple base stations at suitable positions within a given geographical area, a contiguous group of cells can be created to form a wide-area network. In this specification, the terms "network" and "system" will be used equivalently.

In systems of the above type, data is communicated by exchange of packets between the subscriber stations and base station whilst a connection (also called "transport connection") is maintained between them. The direction of transmission of packets from the subscriber station to the base station is called the uplink, and the direction from the base station to the subscriber station is the downlink. The packets have a defined format which follows a layered protocol applied to the system and its component radio devices. Protocol layers relevant to packets as such are the so-called physical layer (PHY) and media access layer (MAC). In the IEEE 802.16-2004 specification, these protocol layers form a protocol "stack" as shown in FIG. 1. Incidentally, FIG. 1 also shows interfaces between protocol layers in the form of service access points (SAPs).

The media access layer is responsible for handling network access, bandwidth allocation, and maintaining connections. Various physical layer implementations are possible in a IEEE 802.16 network, depending on the available frequency range and application; for example, both a time division duplex (TDD) mode—in which uplink and downlink transmissions are separated in time but may share the same frequency—and a frequency division duplex (FDD) mode—where uplink and downlink transmissions can occur at the same time but on different frequencies—are possible. A connection between a base station and subscriber station (more precisely, between MAC layers in those devices—so-called peer entities) is assigned a connection ID (CID) and the base station keeps track of CIDs for managing its active connections. Data is exchanged between the MAC peer entities, in other words, between the subscriber station and base station, in units of a protocol data unit (PDU), the PDU being conveyed across the PHY layer using a number of slots.

The concept of quality of service (QoS) is employed in wireless communication systems for allowing a wide range of services to be provided. During communication with a subscriber station, the base station allocates a QoS level depending on the type of service requested by the subscriber station and available bandwidth, bearing in mind that the base station typically will be communicating with several subscriber stations simultaneously. The QoS is allocated first during a network entry procedure at the time the subscriber station joins the network, and may be modified subsequently by the subscriber station making a request to the base station whilst the connection is maintained.

The relationship between QoS and CID/SFID is illustrated in FIG. 2. For ease of understanding FIG. 2, it is noted that "service flow" refers to transmission of data in a given direction (uplink or downlink) on a connection having a particular QoS. The QoS of the connection is defined by a service flow identifier (SFID) which has a one-to-one relationship to the connection ID.

For example, the IEEE 802.16 specification provides four QoS classes or levels as follows:

(i) Unsolicited Grant Service (UGS):

This service supports real-time data streams consisting of fixed-size packets issued at periodic intervals, such as voice calls (VoIP).

(ii) Real-Time Polling Service (rtPS):

This supports real-time data streams consisting of variable-sized packets issued at periodic intervals, such as MPEG video.

(iii) Non-Real-Time Polling Service (nrtPS):

A service level intended to support delay-tolerant data streams consisting of variable-sized packets for which a minimum transfer rate is needed, such as FTP (File Transfer Protocol).

(iv) Best Effort (BE)

This lowest service level is for data streams with no particular service requirements. Packets are handled as and when bandwidth is available.

However efficient the communication scheme employed in terms of use/re-use of available frequencies, since several subscriber stations typically access the same base station at the same time there is the possibility of "collision" between bandwidth requests among the subscriber stations. A contention-based scheme is therefore adopted in which the QoS is used to allocate bandwidth among the connected subscriber stations.

As already mentioned, packets involve both PHY and MAC protocol layers. More particularly, FIG. 3 shows a packet format having two parts, a PHY header and a MAC PDU. The MAC PDU in turn consists of a MAC header, an optional payload, and optional error correction code (cyclic redundancy code or CRC). FIG. 4 shows a generic MAC header format as specified in IEEE 802.16-2004, including a 16-bit CID.

In single hop systems as envisaged in IEEE 802.16, each subscriber station (SS) will request bandwidth directly from the base station (BS), thus sharing the access to a common base station. If the SS has not got any bandwidth, in the network entry and initialization stage, it will use a CDMA ranging code to request bandwidth. The BS handles these requests on a contention basis as already mentioned. Once the SS gets some initial bandwidth, it may subsequently use a stand-alone bandwidth request MAC (Media Access Control) header or Piggyback request to further request bandwidth.

The Piggyback bandwidth request shall always be incremental. The stand-alone request can be incremental or aggregate.

The service flow between SS and BS can be created and activated during network entry procedure or by dynamic service flow procedure. A service flow ID (SFID) will be assigned to each existing service flow, and each service flow is also associated to a specific QoS demand. A service flow has at least an SFID and an associated direction. The connection ID (CID) of the transport connection exists only when the service flow is admitted or active. The relationship between SFID and transport CID is unique, which means an SFID shall never be associated with more than one transport ID, and a transport CID shall never be associated with more than one SFID. The CID will be enclosed with the bandwidth request, thus the BS can know which SS requests bandwidth, and what is the associated QoS demand.

Recently, efforts are being made to extend IEEE 802.16 to multi-hop configurations in which traffic between BS and SS is routed via one or more relay stations (RS), rather than being transmitted directly. FIG. 5 shows an example of such a configuration having two relay stations labeled RS1# and RS2#. If the network is modified to support relaying functionality as shown in FIG. 5, normally, the relay station (RS) will relay the band requests (BRs) of all SSs or RSs within its coverage to the BS.

The problem with this bandwidth request protocol is that BS will face many bandwidth request messages, which means a lot of bandwidth between BS and RS1#, and contention is likely to be needed between these bandwidth requests. Especially, when the number of hops is more than two, the number of bandwidth requests between BS and its closest RS, such as RS1# in FIG. 5, will be accumulated, thus more bandwidth will be used for signaling overhead. This is a particular problem since in general, uplink bandwidth is more constrained than downlink bandwidth. Moreover, when a CDMA ranging code is used for bandwidth request, the increased number of bandwidth requests received by the BS will increase the collision probability of the transmission of the broadcasted CDMA codes.

On the other hand, in non-transparent or distributed relay systems, an RS may deal with the burst dimensioning, bandwidth allocation, and packet scheduling by itself. These operations are also relevant to bandwidth allocation for the radio devices within its cell. Therefore, it is possible for an RS to be involved in the bandwidth request procedure.

SUMMARY OF EXAMPLE EMBODIMENTS

In accordance with one embodiment of the present invention, a wireless communication method in a wireless communication system is provided. In the wireless communication system, subscriber stations are each operable to communicate with a base station and the base station is capable of performing simultaneous communications with a number of subscriber stations by allocating an available capacity among the subscriber stations. The subscriber stations are required to issue capacity requests in order to obtain and/or maintain a connection with the base station, and communications between the subscriber stations and the base station are performed partly or wholly through at least one relay station. The provided wireless communication method includes, in the relay station, detecting capacity requests issued from a plurality of the subscriber stations, using the detected requests to form at least one combined capacity request, and transmitting the combined capacity request to the base station. Furthermore, the method includes, in the base station, responding to the combined capacity request by reserving capacity for said plurality of subscriber stations. In addition, the method includes, in the relay station or in the base station, allocating the reserved capacity among the plurality of subscriber stations.

BRIEF DESCRIPTION OF THE DRAWINGS

For a more complete understanding of the present invention and its advantages, reference is now made to the following description, taken in conjunction with the accompanying drawings, in which:

FIG. 9 shows a first message format of a combined instant BR in accordance with particular embodiments of the present invention; and FIG. 10 shows a second message format of a combined instant BR in accordance with particular embodiments of the present invention.

DETAILED DESCRIPTION

Figure 1:
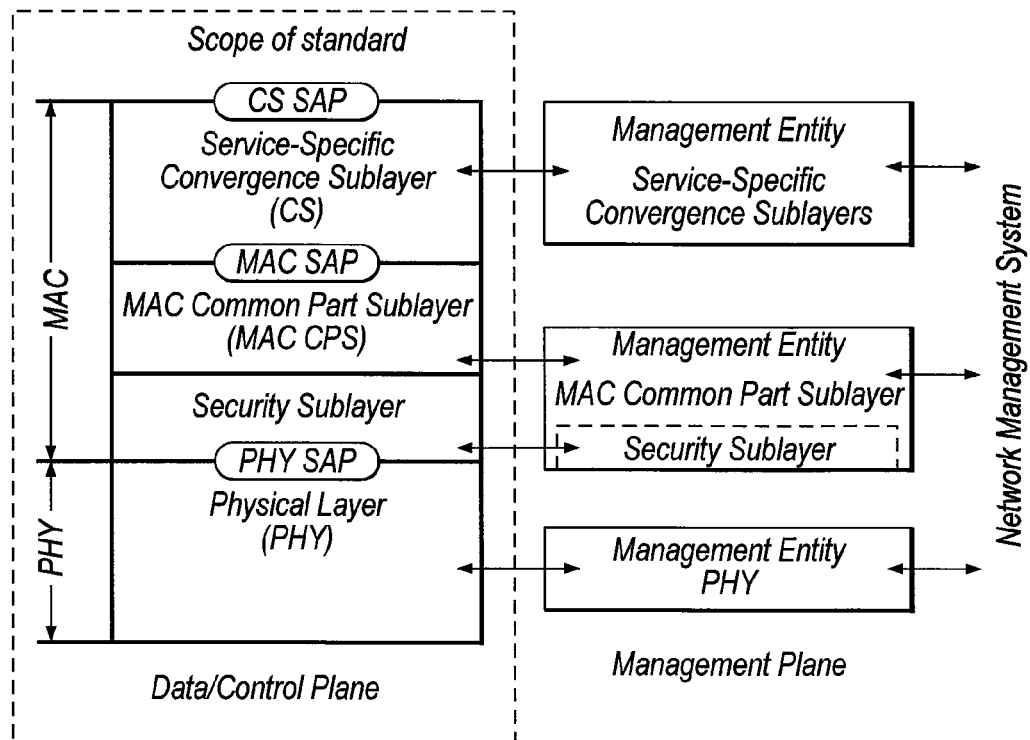
FIG. 1 shows protocol layering in accordance with IEEE 802.16.
Figure 2:
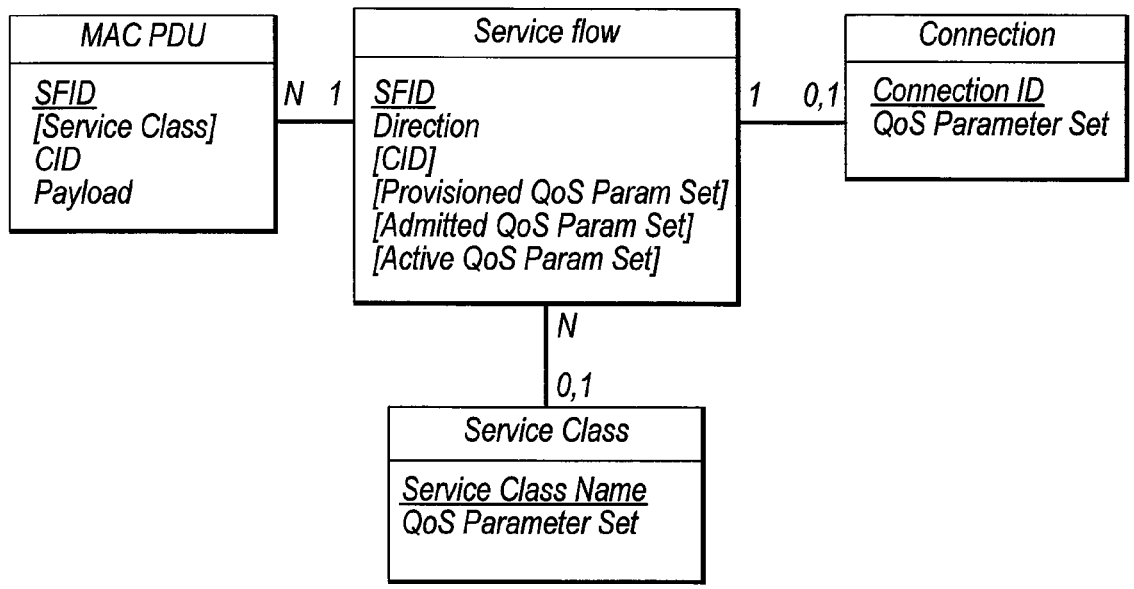
FIG. 2 shows the relationship between CID, SFID and QoS in an IEEE 802.16 network.
Figure 3:
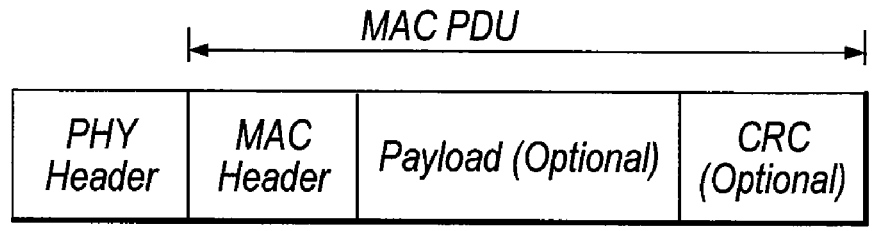
FIG. 3 shows a packet format capable of being used in an IEEE 802.16 network.
Figure 4:
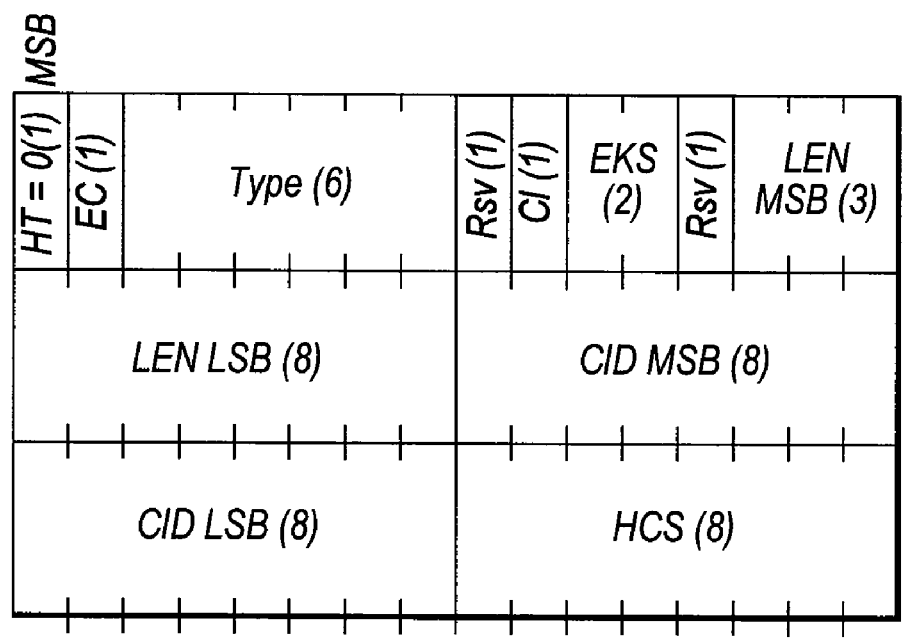
FIG. 4 shows a generic MAC header of a packet as set forth in the IEEE 802.16 specification.
Figure 5:
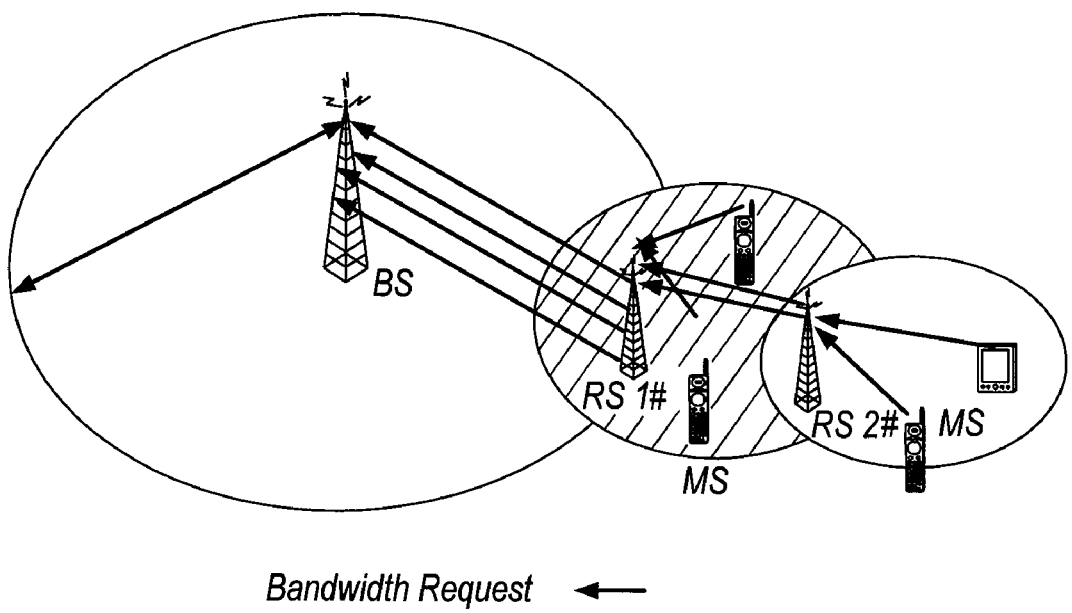
FIG. 5 illustrates a simple bandwidth request protocol in a multi-hop wireless communication system.
Figure 6:
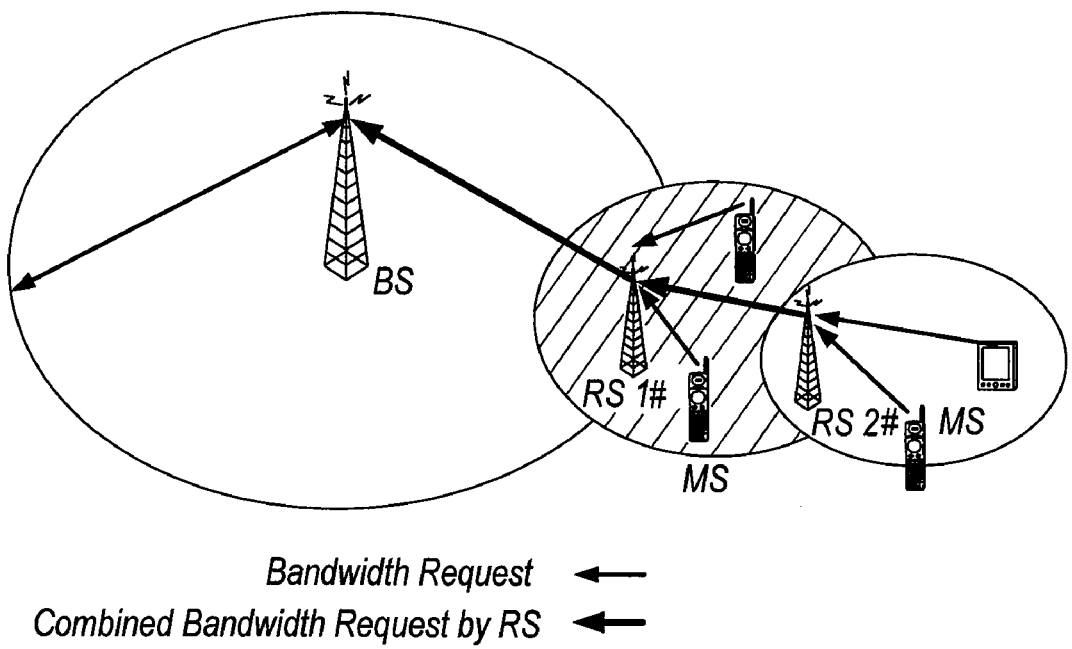
FIG. 6 illustrates the bandwidth request (BR) protocol employed in particular embodiments of the present invention.

An embodiment of the present invention will now be described with reference to FIGS. 6-10, using an IEEE 802.16 network as an example. An algorithm is proposed by which the relay station can classify and combine the bandwidth requests from the subscriber stations (or any other relay station) within its cell, and submit the combined bandwidth requests to the base station, thus decreasing the overhead and collision of bandwidth request messages. This is schematically shown in FIG. 6, in which the subscriber stations are mobile stations denoted by MS. The thick arrow in FIG. 6 represents a combined BR formed in the RS and replacing the multiple parallel BRs relayed by the RS in FIG. 5. As already mentioned, bandwidth requests (BRs) fall into two categories, initial BRs and further BRs, and these are treated differently in the present embodiment.

1. Initial Bandwidth Request

Figure 7:
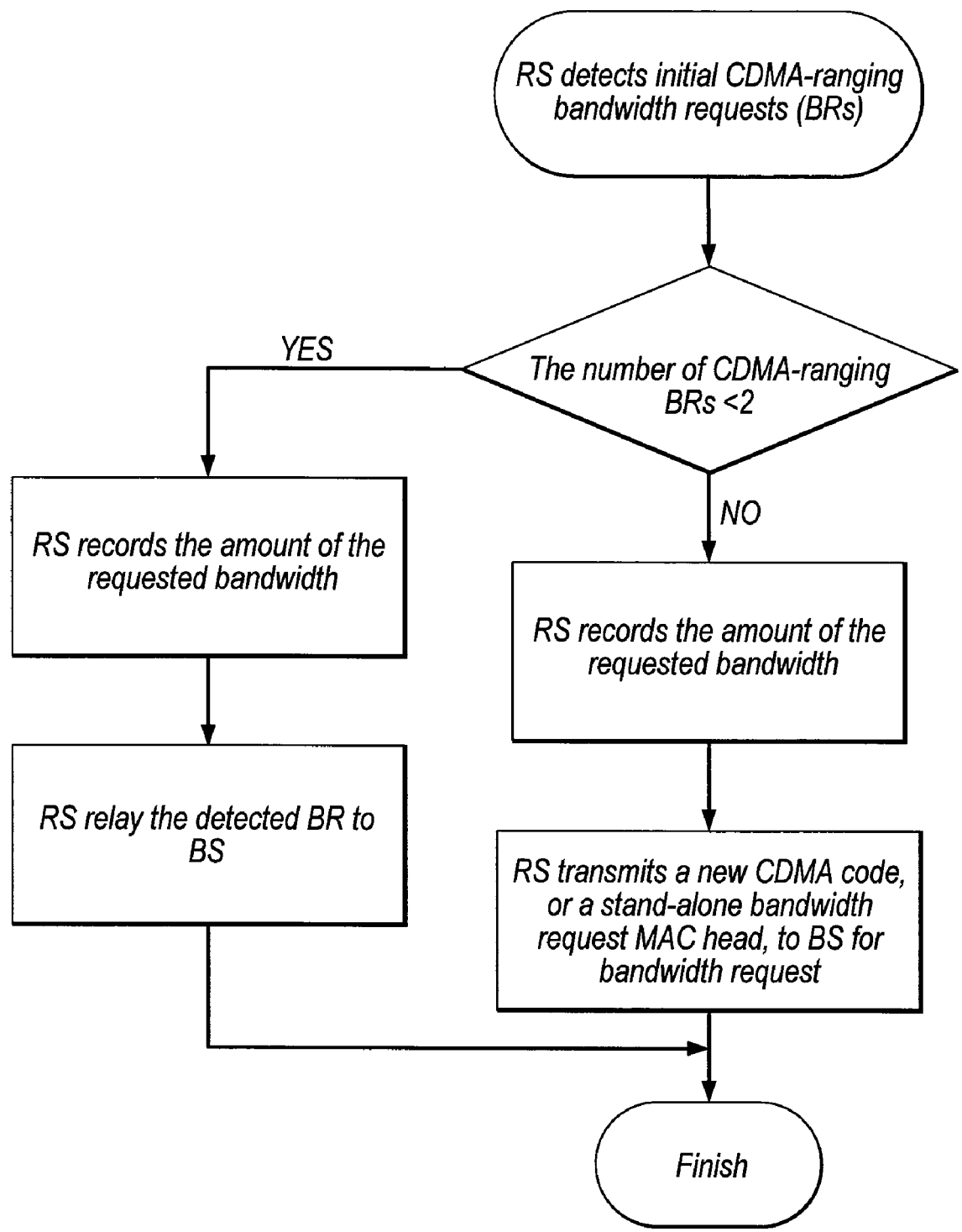
FIG. 7 is a flowchart of processing of initial bandwidth requests in a relay station (RS)

In the network entry and initialization stage, each SS within range of an RS will use contention-based CDMA ranging for requesting initial bandwidth. When the RS detects these CDMA codes, it can send a different CDMA code to the BS to request bandwidth for these SSs, rather than simply relaying two detected CDMA codes to BS, thus saving bandwidth and decreasing the collision probability of the CDMA code transmission surround BS. Alternatively, the RS can use a stand-alone bandwidth request MAC header to request bandwidth for these SSs. This procedure is shown in the flowchart of FIG. 7.

2. Further Bandwidth Request

Figure 8:
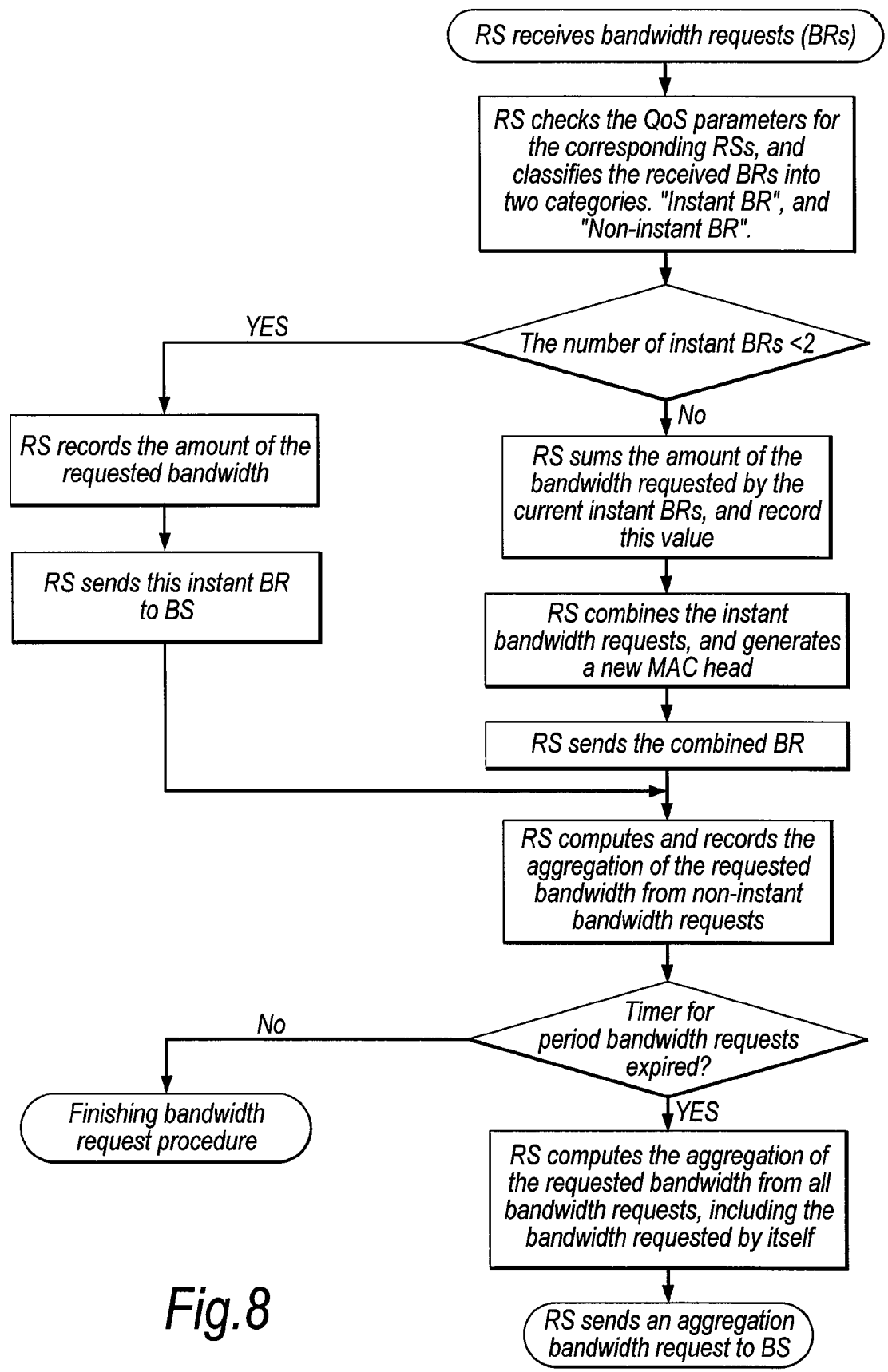
FIG. 8 is a flowchart of processing of further bandwidth requests in the RS.

As explained above, once the SS gets some initial bandwidth, it may subsequently use a stand-alone bandwidth request MAC (Media Access Control) header or Piggyback request to further request bandwidth. In this stage, the RS classifies the received standalone or Piggyback BRs into "Instant BR" (IBR), and "Non-instant BR" (NIBR). The IBRs will be combined and sent to BS by RS as soon as possible. The NIBRs will be combined and sent by periodical aggregate BR by RS. The procedure in the relay station for processing such further BRs is shown in FIG. 8. The first stage is for the RS to receive BRs. Then RS shall identify the QoS parameters relating to the service flow of the corresponding bandwidth request. For example, an RS can index the connection ID (CID) enclosed within the BRs to find the QoS demands. To allow RS to learn the QoS demands of service flows, during the service connection request period, BS has to tell the RS the information of the approved service flows. Alternatively, an RS can "listen in" to the information exchanged during the service connection request period to obtain the QoS associated with the CID, and the relationship between service flow and CID.

In light of QoS demands, the received BRs will be classified into two categories, IBR, and NIBR, by RS. For example, the BRs relevant to Unsolicited Grant Service (UGC), and Real-time Polling Service (rtPS) may be identified as IBR. The BRs for Best Effort (BE), and Non-real-time Polling Service (nrtPS) may be classified as NIBR.

If the number of received IBRs is one, then RS records the amount of the bandwidth requested by this IBR, and simply sends this IBR to BS as soon as possible. This IBR can be incremental or aggregate. The RS will keep the original CID for this IBR. If the number of received IBRs in the current frame is more than one, then RS will combine these IBRs to one BR, called combined IBR, and send this combined BR to BS as soon as possible. In this case, the RS will also record the aggregation of the requested bandwidth of all IBRs. This combined BR can be incremental or aggregate.

A first possible message format of a combined IBR is shown in FIG. 9 (Format A). The details of this control message format are listed in Table 1 below.

TABLE 1

Bandwidth request control message format A of a combined IBR

| Name | Description |
| --- | --- |
| Head | Type of the message, etc. |
| Amount of the N$^{th}$ IBR | The number of units, such as bytes, of uplink bandwidth requested by the N$^{th}$ IBR |
| Other information of the N$^{th}$ IBR | It is optional. It could be the relevant transmission power, and CINR etc. |
| Connection ID of the N$^{th}$ IBR | Connection ID |
| Check sequence | To check the received message, such as CRC sequence |

To decrease the size of the control message of a combined IBR, the RS can use the message format shown in FIG. 10 (Format B). The details of this control message are listed in Table 2. When using this message format, the RS will use one of its existing (previously configured) CIDs, which is associated with all CIDs used by its SS, or MS, and RS. The BS will know that the bandwidth request enclosed with this CID is used for the SSs and any other RSs connected to the RS.

TABLE 2

Bandwidth request message format B of a combined IBR

| Name | Description |
| --- | --- |
| Head | Type of the message, etc. |
| The aggregation of all IBR | The total number of units, such as bytes, of uplink bandwidth requested by the all IBRs |
| Other information | It is optional. It could be the relevant transmission power, and CINR etc. |
| Connection ID | RS can apply an existing connection ID, which is associated with all the CIDs belonging to all radio devices connected with itself. |
| Check sequence | To check the received message, such as CRC sequence |

After processing the IBRs, the RS will record the aggregation of the requested bandwidth by all NIBRs. When the timer for periodical RS bandwidth request is expired, the RS will work out the aggregation of the bandwidth needed for its uplink transmission, and transmit an aggregate bandwidth request to the BS. The RS can use the "message format B" in FIG. 10 for this bandwidth request. Therefore, an existing CID is needed by RS to associate all CIDs connected to itself. The period of the aggregate bandwidth request may be a function of the QoS of the services relating to NIBRs, and of the link quality.

In response to the BR from the RS, the BS performs necessary processing for allocation of bandwidth. In the case of a format A bandwidth request (FIG. 9), the amounts of bandwidth (incremental or aggregate) required by the individual SSs (or other RSs) is contained in the request from the RS. In this case the BS must allocate bandwidth on an individual basis and notify the RS accordingly, the RS then simply noting the amounts so notified. In the case of a format B bandwidth request (FIG. 10), the BS grants the requested amount (if possible; otherwise a lesser amount) and informs the RS accordingly. It is then up to the RS to allocate the granted bandwidth by dividing up the granted amount appropriately among the requesting SSs/RSs, in dependence upon their QoS requirements.

Although the above description concerns the processing in a single RS and BS, other RSs may be present in the network. In this case, in relation to each other RS, the first RS may act like the BS in the above explanation. Each other RS will serve its own set of SSs and combine the BRs received from those SSs in the same manner as explained above for the first RS.

In summary, certain embodiments of the present invention may provide one or more of the following features:

Defining a protocol for an RS to process the received bandwidth requests.

Minimizing the control message overhead by classifying and combining received bandwidth requests in RS.

Decreasing the collision probability for the contention style bandwidth request.

The method proposed can be used for other message relaying, thus achieving the above benefits.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the RS or BS in particular embodiments of the present invention. It is also possible to provide each SS with some or all of the functionality of the RS. Particular embodiments of the invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A wireless communication method in which subscriber stations are each operable for communication with a base station, the base station being capable of performing simultaneous communications with a number of subscriber stations by allocating an available bandwidth among the subscriber stations, the subscriber stations being required to issue bandwidth requests in order to obtain and/or maintain a connection with the base station, and communications between the subscriber stations and the base station being performed partly or wholly through at least one relay station, the method comprising:
   in the relay station, detecting bandwidth requests issued from a plurality of the subscriber stations, using the detected requests to form at least one combined bandwidth request, and transmitting the combined bandwidth request to the base station;
   in the base station, responding to the combined bandwidth request by reserving bandwidth for said plurality of subscriber stations; and
   in the relay station or in the base station, allocating the reserved bandwidth among the plurality of subscriber stations;
   wherein each connection between a subscriber station and the base station has a connection identifier, the bandwidth request from the subscriber stations including connection identifiers, and the relay station transmitting said combined bandwidth request with a single existing connection identifier which is associated with all connection identifiers used by the subscriber stations connected to the relay station without information identifying each of the subscriber stations.

2. The method according to claim 1, wherein each subscriber station issues a bandwidth request as part of a network entry procedure to obtain a connection with the base station.

3. The method according to claim 2, wherein the bandwidth request is a request for an aggregate amount of bandwidth.

4. The method according to claim 1, wherein at least some subscriber stations issue a bandwidth request during communication with the base station to maintain or change an existing connection with the base station.

5. The method according to claim 4, wherein the bandwidth request is a request for an incremental amount of bandwidth.

6. The method according to claim 1, wherein the bandwidth request is an initial bandwidth request in the form of a CDMA ranging code.

7. The method according to claim 6, wherein the relay station transmits the combined bandwidth request in the form of a CDMA code.

8. The method according to claim 1, wherein the bandwidth request is a further bandwidth request in the form of a stand alone media access control header.

9. The method according to claim 1, wherein the relay station transmits the combined bandwidth request in the form of a stand alone media access control header.

10. The method according to claim 1, wherein communication is performed through exchange of packets and the relay station transmits the combined bandwidth request in a medium access control layer header of such a packet.

11. The method according to claim 1, wherein the combined bandwidth request includes details of individual bandwidth requests detected in said detecting step.

12. The method according to claim 11, wherein each connection between a subscriber stations and the base station has a connection ID, and said details include connection IDs corresponding to the detected bandwidth requests.

13. The method according to claim 1, wherein the combined bandwidth request aggregates the amounts of bandwidth contained in the detected bandwidth requests without including details of the individual bandwidth requests.

14. The method according to claim 1 wherein the relay station classifies the detected bandwidth requests into urgent and non-urgent requests.

15. The method according to claim 14 wherein separate combined bandwidth requests are formed using the urgent and the non-urgent requests respectively.

16. The method according to claim 15 wherein said step of transmitting the combined bandwidth request includes immediately transmitting a combined bandwidth request formed using urgent requests, whilst delaying transmission of a combined bandwidth request formed using non-urgent requests.

17. The method according to claim 16 wherein the relay station waits for a predetermined time period to elapse before transmitting the combined bandwidth request formed from non-urgent requests.

18. The method according to claim 1, wherein each connection between a subscriber station and the base station is assigned one of a plurality of levels of quality-of-service (QoS), and wherein the relay station classifies the detected bandwidth requests based on the QoS.

19. The method according to claim 18, wherein each connection between a subscriber station and the base station has a connection ID with which QoS information is associated, the relay station obtaining the QoS based on the connection ID.

20. The method according to claim 1, wherein the system comprises at least one further relay station in communication with said relay station, the further relay station performing the same steps as said relay station in relation to further subscriber stations with said relay station acting as its base station, said relay station detecting a bandwidth request from said further relay station and using that bandwidth request in forming said combined bandwidth request.

21. The method according to claim 1, wherein one or more of the subscriber stations are mobile stations.

22. A wireless communication system in which subscriber stations are each operable for communication with a base station, the base station being capable of performing simultaneous communications with a number of subscriber stations by allocating an available bandwidth among the subscriber stations, the subscriber stations being required to issue bandwidth requests in order to obtain and/or maintain a connection with the base station, and communications between the subscriber stations and the base station being performed partly or wholly through at least one relay station, wherein:

the relay station is arranged to detect bandwidth requests issued from a plurality of the subscriber stations, to use the detected requests to form at least one combined bandwidth request, and transmit the combined bandwidth request to the base station;

the base station is responsive to the combined bandwidth request to reserve bandwidth for said plurality of subscriber stations; and the relay station or the base station is arranged to allocate the reserved bandwidth among the plurality of subscriber stations;

wherein each connection between a subscriber station and the base station has a connection identifier, the bandwidth request from the subscriber stations including connection identifiers, and the relay station is arranged to transmit said combined bandwidth request with a single existing connection identifier which is associated with all connection identifiers used by the subscriber stations connected to the relay station without information identifying each of the subscriber stations.

23. A relay station for use in a wireless communication system in which subscriber stations are each operable for communication with a base station, the base station being capable of performing simultaneous communications with a number of subscriber stations by allocating an available bandwidth among the subscriber stations, the subscriber stations being required to issue bandwidth requests in order to obtain and/or maintain a connection with the base station, and communications between the subscriber stations and the base station being performed partly or wholly through the relay station, wherein the relay station comprises:

a detector for bandwidth requests issued from a plurality of the subscriber stations;

a combiner arranged to form at least one combined bandwidth request from the detected requests; and a transmitter for transmitting the combined bandwidth request to the base station; wherein:

the relay station is responsive to a notification of reserved bandwidth received from the base station, to allocate the reserved bandwidth among the plurality of subscriber stations; and each connection between a subscriber station and the base station has a connection identifier, the bandwidth request from the subscriber stations including connection identifiers, and the relay station transmitting said combined bandwidth request with a single existing connection identifier which is associated with all connection identifiers used by the subscriber stations connected to the relay station without information identifying each of the subscriber stations.

24. The relay station according to claim 23, wherein communication in said system is performed through exchange of packets and the transmitter is arranged to transmit the combined bandwidth request in a medium access control layer header of such a packet.

25. The relay station according to claim 23, wherein the combined bandwidth request includes details of individual bandwidth requests detected by said detector.

26. The relay station according to claim 25, wherein the notification of reserved bandwidth received from the base station includes information on an individual amount of bandwidth for each subscriber station to be allocated by the relay station.

27. The relay station according to claim 23, wherein the combined bandwidth request does not include details of individual bandwidth requests detected by said detector.

28. The relay station according to claim 27, wherein the notification of reserved bandwidth includes an aggregate amount of bandwidth and the relay station is arranged to partition the reserved bandwidth among the plurality of subscriber stations.

29. The relay station according to claim 23, wherein the combiner classifies the detected bandwidth requests into urgent and non-urgent requests.

30. The relay station according to claim 29, wherein the combiner is arranged to form separate combined bandwidth requests using the urgent and the non-urgent requests respectively.

31. The relay station according to claim 30, wherein the transmitter is arranged for immediately transmitting a combined bandwidth request formed using urgent requests, whilst delaying transmission of a combined bandwidth request formed using non-urgent requests.

32. The relay station according to claim 31, wherein the transmitter is arranged to wait for a predetermined time period to elapse before transmitting the combined bandwidth request formed from non-urgent requests.

33. The relay station according to claim 23, wherein each connection between a subscriber station and the base station is assigned one of a plurality of levels of quality-of-service (QoS), and wherein the relay station classifies the detected bandwidth requests based on the QoS.

34. The relay station according to claim 33, wherein each connection between a subscriber station and the base station has a connection ID with which QoS information is associated, and said classifying involves obtaining the QoS based on the connection ID.

35. The relay station according to claim 23, wherein the detector is arranged to detect a bandwidth request from at least one further relay station, the further relay station performing the same role as said relay station in relation to further subscriber stations, and said combiner is arranged to use that bandwidth request in forming said combined bandwidth request.

36. A base station for use in a wireless communication system in which subscriber stations are each operable for communication with the base station, the base station being capable of performing simultaneous communications with a number of subscriber stations by allocating an available bandwidth among the subscriber stations, the subscriber stations being required to issue bandwidth requests in order to obtain and/or maintain a connection with the base station, and communications between the subscriber stations and the base station being performed partly or wholly through at least one relay station, wherein the relay station detects bandwidth requests issued from a plurality of the subscriber stations and transmits a combined bandwidth request to the base station; the base station comprising:

a decoder for decoding the combined bandwidth request received from the relay station;

a processor, responsive to results of said decoding to reserve bandwidth for the plurality of subscriber stations; and a transmitter for informing the relay station of the reserved bandwidth;

wherein each connection between a subscriber station and the base station has a connection identifier, the bandwidth request from the subscriber stations including connection identifiers, and the relay station transmitting said combined bandwidth request with a single existing connection identifier which is associated with all connection identifiers used by the subscriber stations connected to the relay station without information identifying each of the subscriber stations.

37. The base station according to claim 36, wherein communication in said system is performed through exchange of packets and the decoder is arranged to decode the combined bandwidth request in a medium access control layer header of such a packet.

38. The base station according to claim 36, wherein the decoder is arranged to extract details of individual bandwidth requests made by the subscriber stations and contained in the combined bandwidth request.

39. The base station according to claim 38, wherein the processor is arranged to reserve an individual amount of bandwidth for each subscriber stations, said transmitter informing the relay station of the individual amounts of bandwidth.

40. The base station according to claim 36, wherein in the event that the combined bandwidth request does not include details of individual bandwidth requests, the processor reserves an aggregate amount of bandwidth for the subscriber stations, said transmitter informing the relay station of the aggregate amount of bandwidth.

* * * * *